(12) United States Patent
Dong et al.

(10) Patent No.: US 10,173,157 B2
(45) Date of Patent: Jan. 8, 2019

(54) FILTER ASSEMBLY

(71) Applicants: MICROFILTER CO., LTD., Chungcheongbuk-do (KR); Joung Whi Dong, Seoul (KR)

(72) Inventors: Joung Whi Dong, Seoul (KR); Jaeik Lee, Chungcheongbuk-do (KR); Pilkang Hwang, Chungcheongbuk-do (KR)

(73) Assignees: MICROFILTER CO., LTD., Chungcheongbuk-do (KR); Joung Whi Dong, Seoul (KR)

( * ) Notice: Subject to any disclaimer, the term of this patent is extended or adjusted under 35 U.S.C. 154(b) by 481 days.

(21) Appl. No.: 15/071,684

(22) Filed: Mar. 16, 2016

(65) Prior Publication Data
US 2016/0271535 A1    Sep. 22, 2016

(30) Foreign Application Priority Data

Mar. 16, 2015  (KR) .................. 10-2015-0036063

(51) Int. Cl.
| | | |
|---|---|---|
| *B01D 35/30* | (2006.01) | |
| *B01D 35/147* | (2006.01) | |
| *B01D 35/153* | (2006.01) | |
| *B01D 35/12* | (2006.01) | |
| *B01D 29/56* | (2006.01) | |
| *B01D 27/08* | (2006.01) | |

(52) U.S. Cl.
CPC .......... *B01D 35/306* (2013.01); *B01D 27/08* (2013.01); *B01D 29/56* (2013.01); *B01D 35/12* (2013.01); *B01D 35/147* (2013.01); *B01D 35/153* (2013.01); *B01D 35/30* (2013.01); *B01D 2201/302* (2013.01); *B01D 2201/305* (2013.01); *B01D 2201/306* (2013.01); *B01D 2201/307* (2013.01); *B01D 2201/4084* (2013.01)

(58) Field of Classification Search
CPC .... B01D 35/30; B01D 35/153; B01D 35/306; B01D 35/147; B01D 29/56; B01D 27/08; B01D 2201/302; B01D 2201/305; B01D 2201/4084; B01D 2201/306; B01D 2201/307
USPC ........................ 210/232, 236, 238, 234, 235
See application file for complete search history.

(56) References Cited

U.S. PATENT DOCUMENTS

| | | | |
|---|---|---|---|
| 9,863,575 B2 * | 1/2018 | Joung | .................... F16M 13/00 |
| 9,885,445 B2 * | 2/2018 | Joung | .................... H02J 7/0016 |
| 9,993,757 B2 * | 6/2018 | Joung | .................... B01D 27/00 |
| 2016/0025406 A1 * | 1/2016 | An | ........................ F25D 23/126 |
| | | | 222/143 |

FOREIGN PATENT DOCUMENTS

| | | | | |
|---|---|---|---|---|
| KR | 10-0521117 | 10/2005 | ............. | B01D 35/14 |
| KR | 10-1285605 | 7/2013 | ........... | B01D 35/153 |

* cited by examiner

*Primary Examiner* — Thomas M Lithgow
(74) *Attorney, Agent, or Firm* — Harness, Dickey & Pierce, P.L.C.

(57) ABSTRACT

Disclosed herein is a filter assembly, and more particularly, to a filter assembly in which an uneven portion is formed on an inner wall of a hollow external housing and a filter fastening unit which includes a pressurized section pressurized by the uneven portion is formed around an inner cap which moves up and down along an inner surface of the external housing to firmly fasten a filter.

11 Claims, 10 Drawing Sheets

FILTER ASSEMBLY

CROSS-REFERENCE TO RELATED APPLICATION

This application claims the benefit of Korean Patent Application No. 2015-0036063, filed on Mar. 16, 2015 in the Korean Intellectual Property Office, the disclosure of which is incorporated herein by reference in its entirety.

FIELD

The present invention relates to a filter assembly, and more particularly, to a filter assembly in which an uneven portion is formed on an inner wall of a hollow external housing and a filter fastening unit which includes a pressurized section pressurized by the uneven portion is formed around an inner cap which moves up and down along an inner surface of the external housing to firmly fasten a filter.

BACKGROUND

Generally, water purifiers include various types of filters such as a precipitation filter, a carbon filter, a membrane filter, etc. connected and installed thereinside depending on use thereof to allow water to go through a physical or chemical process to be purified while passing through filters.

Filters described above have a structure in which an inlet into which water is injected and an outlet through which water is discharged are formed in a head of a filter and coupled with connection pipes to be connected with many water purifying filters to purify and supply water supplied form a water source to a water tank of a water purifier.

Meanwhile, Korean Patent Application No. 10-2005-0020547, filed by the present applicant, discloses a water purifier filter having a means of fluid interception, capable of cutting off original water without an additional original water cut-off valve outside a purifier to provide aesthetic advantages and convenience in use.

FIG. 1 is a configuration diagram of a water purifier which includes a plurality of water purifying filters installed therein according to a conventional art.

As shown in the drawing, in the conventional water purifier, a preprocessing precipitation filter 1, a pre carbon filter 2, a membrane filter 3, a post carbon filter 4, etc. are mounted thereon to be used.

Here, the precipitation filter 1 provides a function of preliminarily filtering foreign substances such as sand, heavy metals, etc. included in water, the pre carbon filter 2 provides a function of adsorbing and removing a chlorine chemical, trihalomethane, organic chemicals, etc. dissolved in the water, the membrane filter 3 is a core filter of the water purifier and provides a function of finally filtering foreign substances formed of heavy metals, viruses, bacteria, organic chemicals using a reverse osmosis concentration method through a high precision semipermeable membrane, and the post carbon filter 4 provides a function of filtering gas ingredients and odor ingredients dissolved in the water.

The respective filters 1, 2, 3, and 4 which provide various functions described above need to occasionally remove a body from a filter head to clean an inside of a filter or replace a filter membrane for each certain period while used.

However, since a flow of the water is automatically cut off when one of the plurality of filters connected to be used is removed from the head, the conventional water purifier is not used. Also, when a user temporarily turns off water, water inside the filters flows back and contaminates original water.

To overcome problems described above, Korean Patent Application No. 10-2011-0043763, filed by the present applicant, discloses a filter head for a water purifying filter capable of preventing backflow in which the head of the water purifying filter having a bypass function and a backflow prevention means are integrally formed in such a way that even though a filter is separated from the head, it is possible to use a water purifier and simultaneously to prevent contamination of original water.

However, in the case of the conventional filter head having the backflow preventing function, since respective flow channels formed below a pipe body which forms an inlet and an outlet are linearly formed, installation and disassembling are difficult and fastening is not strong due to high water pressure when a filter is replaced.

Accordingly, a technology of proving a practical and applicable filter assembly capable of not only forming a bypass flow channel but also easily installing and disassembling a filter even though a metal spring installed inside the flow channel of the filter head connected to the inlet and outlet is removed.

PATENT DOCUMENT

Patent Document 1: Korean Patent Publication No. KR10-0521117 (Oct. 12, 2005).

Patent Document 2: Korean Patent Publication No. KR10-1285605 (Jul. 8, 2013)

SUMMARY

Therefore, it is an aspect of the present invention to provide a filter assembly in which an uneven portion is formed on an inner wall of a hollow external housing and a filter fastening unit which includes a pressurized section pressurized by the uneven portion is formed around an inner cap which moves up and down along an inner surface of the external housing to firmly fasten a filter.

Additional aspects of the invention will be set forth in part in the description which follows and, in part, will be obvious from the description, or may be learned by practice of the invention.

In accordance with one aspect of the present invention, a filter assembly includes a hollow external housing which includes an inlet (110) and an outlet (120) and has an inner wall of an open bottom on which a plurality of uneven portions (130) circularly arranged at certain intervals are formed, an inner cap (200) which is formed in a cylindrical shape with an open bottom corresponding to an internal hollow shape of the external housing and moves up and down along the inner wall of the external housing (100), a filter (300) which includes a head portion (310) inserted into the bottom of the inner cap (200) and forms a fitting groove (320) on a side of the head portion (310), an elastic member (400) which is disposed between an upper portion of the inner wall of the external housing (100) and an upper portion of an outer surface of the inner cap (200) and has a repulsive force which acts when the head portion (310) of the filter (300) receives a force from a top in the inner cap (200), and a filter fastening unit (500) which includes a plurality of pressurized sections (510) disposed on a lower circumference of the inner cap (200) corresponding to the plurality of the uneven portions (130), in which when the filter (300) is inserted into the inner cap (200), the plurality of pressurized sections (510) are pressurized by the plurality of uneven portions (130) formed on the inner wall of the external housing (100) and steps formed at ends while protruding inside the plurality of pressurized sections (510) are fixed to the fitting groove (320) of the filter (300).

The inner cap (200) may further include a plurality of auxiliary sections (210) which intersect with the plurality of pressurized sections (510) which form the filter fastening unit (500) and are circularly arranged on an outer circumferential surface of the bottom thereof. Here, when the inner cap (200) receives an external force and moves up and down, the plurality of auxiliary sections (210) may move while supporting an inner surface of the external housing (100) between the plurality of uneven portions (130).

The external housing (100) may include a detachment preventing protrusion (140) formed on an edge inside the opening bottom in such a way that a supporting protrusion formed at an end of each of the plurality of pressurized sections (510) and at an end of each of the plurality of auxiliary sections (210) while protruding outward are held by the detachment preventing protrusion (140) and prevents the inner cap (200) and the filter fastening unit (500) from being externally detached.

The filter fastening unit (500) may include a coupling section (511) between the plurality of pressurized sections (510) to allow the coupling section (511) to be coupled with a coupling groove (211) formed on an outer surface of each of the plurality of auxiliary sections (210) provided at the inner cap (200).

The inner cap (200) may include a plurality of flow channels therein in which a bypass flow channel is disposed on top and a water purifying flow channel is disposed at the bottom. Here, when the filter (300) is inserted, the inner cap (200) may move up in the external housing (100) and the water purifying flow channel disposed at the bottom may be connected. When the fastening of the filter (300) is released, the inner cap (200) may move down in the external housing (100) and the bypass flow channel disposed on top may be connected.

The external housing (100) may include a supply pipe (111) and a discharge pipe (121) to which the inlet (110) and the outlet (120) are connected to and in contact with the side of the inner cap (200) in an elbow structure, respectively.

The supply pipe (111) and the discharge pipe (121) may include sealing members (112, 122) for watertight structures of portions thereof connected to and in contact with the side of the inner cap (200), respectively.

The filter assembly may further include a ratchet member (600) which receives forces from a top and a bottom at the open bottom of the external housing (100), performs a push-and-push type one touch operation when the filter (300) is assembled and released, and guides a position of the inner cap (200).

The ratchet member (600) may include a ratchet pin (610) which is fixed to an outer surface of the inner cap (200) and guides the position of the inner cap (200) and a ratchet guide plate (620) connected to the ratchet guide pin (610) while being fixed to the external housing (100) and includes a ratchet path for allowing the inner cap (200) to move up and down in the inner wall of the external housing (100) when the filter (300) is assembled with or released from an inside of the inner cap (200).

The filter (300) may have a structure in which a purified water outlet (340) is located in a center and an original water inlet (330) is disposed around the purified water outlet (340) with a step therebetween.

In accordance with another aspect of the present invention, a filter assembly includes a hollow external housing which includes an inlet (110) and an outlet (120), a plurality of uneven portions (130) circularly arranged at certain intervals are formed on an inner wall of an open bottom, and a detachment preventing protrusion (140) is formed on an inner edge of an entrance of the open bottom, an inner cap (200) which is formed in a cylindrical shape with an open bottom corresponding to an internal hollow shape of the external housing (100), includes a plurality of pressurized sections (510) integrally formed on a lower circumference thereof corresponding to the plurality of uneven portions (130), and moves up and down along the inner wall of the external housing (100), a filter (300) which includes a head portion (310) inserted into the bottom of the inner cap (200) and forms a fitting groove (320) on a side of the head portion (310), and an elastic member (400) which is disposed between an upper portion of the inner wall of the external housing (100) and an upper portion of an outer surface of the inner cap (200) and has a repulsive force which acts when the head portion (310) of the filter (300) receives a force from a top in the inner cap (200). Here, when the filter (300) is inserted into the inner cap (200), the plurality of pressurized sections (510) are pressurized by the plurality of uneven portions (130) formed on the inner wall of the external housing (100) and steps formed at ends while protruding inside the plurality of pressurized sections (510) are fixed to the fitting groove (320) of the filter (300). When the filter (300) is externally separated from the inner cap (200), supporting portions formed at ends of the plurality of pressurized sections (510) while protruding outward are held by the detachment preventing portion (140) and prevent the inner cap (200) from being externally detached.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
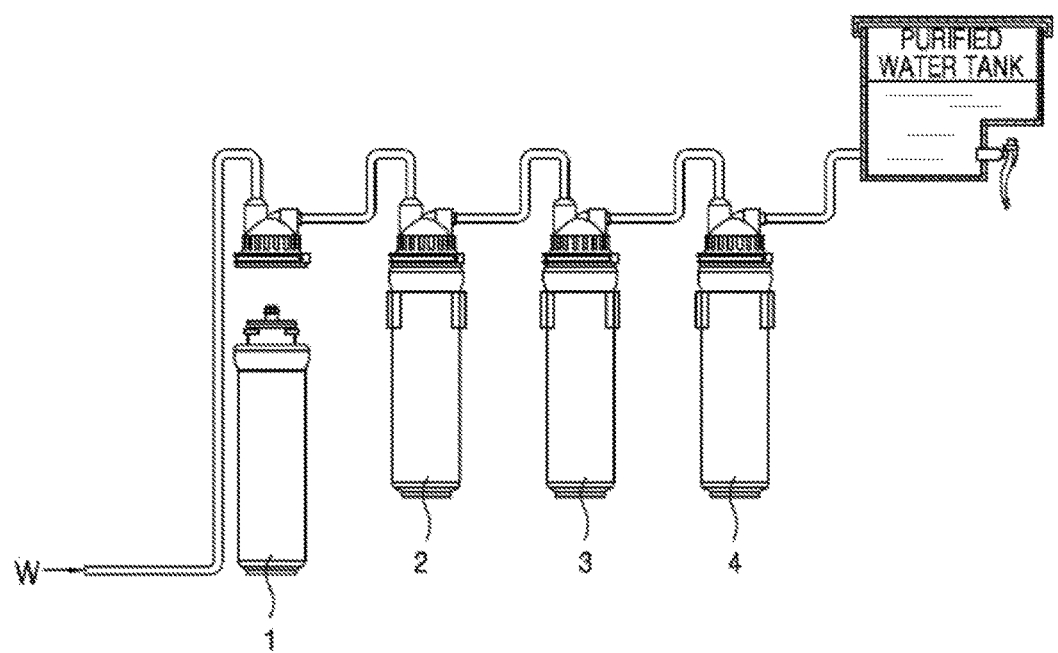
FIG. 1 is a configuration diagram of a water purifier which includes a plurality of water purifying filters installed therein according to a conventional art.

Since embodiments of the present invention will be structurally or functionally described, the scope of the present invention will not be limited to the embodiments described herein. That is, since the embodiments may be variously modified and may have various forms, the scope of the present invention will be understood as including equivalents thereof which can embody technical concept thereof.

Meanwhile, the meaning of terms described herein will be understood as follows.

It will be understood that although the terms "first", "second", etc. may be used herein to describe various components, these components should not be limited by these terms. These terms are only used to distinguish one component from another. For example, a first component may be referred to as a second component, and similarly, the second component may be referred to as the first component.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components. Meanwhile, other expressions which describe relationships between components, that is, "between" and "directly between" or "adjacent to" and "directly adjacent to" will be also understood similarly thereto.

The singular forms intended to include the plural forms, unless the context clearly indicates otherwise. It will be understood that the terms "comprise" and/or "have" used herein specify the presence of stated features, numbers, steps, operations, elements, components or combinations thereof but not to preclude the presence or addition of one or more other features, numbers, steps, operations, elements, components, or combinations thereof.

In respective steps, reference symbols, for example, a, b, c, etc. are used for convenience of description. These reference symbols do not indicate an order of the respective steps. The respective steps, unless defined clearly in contexts, may be performed differently from a stated order. That is, the respective steps may be performed identically to the stated order, may be performed substantially at the same time, and may be performed in the reverse order.

All terms used herein, unless defined otherwise, have the same meaning generally understood by one of ordinary skill in the art. Terms defined in generally used dictionaries may be understood as contextual meanings generally known in the art and, unless defined clearly in the specification, will not have ideally or excessively formal meanings.

A filter assembly in accordance with one embodiment of the present invention may be not only applied to a fastening structure of a water purifying filter in accordance with one embodiment of the present invention but also applied to a fastening structure of a storage container and a processing device for a fluid.

Hereinafter, the embodiments of the present invention will be described in detail with reference to the attached drawings.

Figure 2:
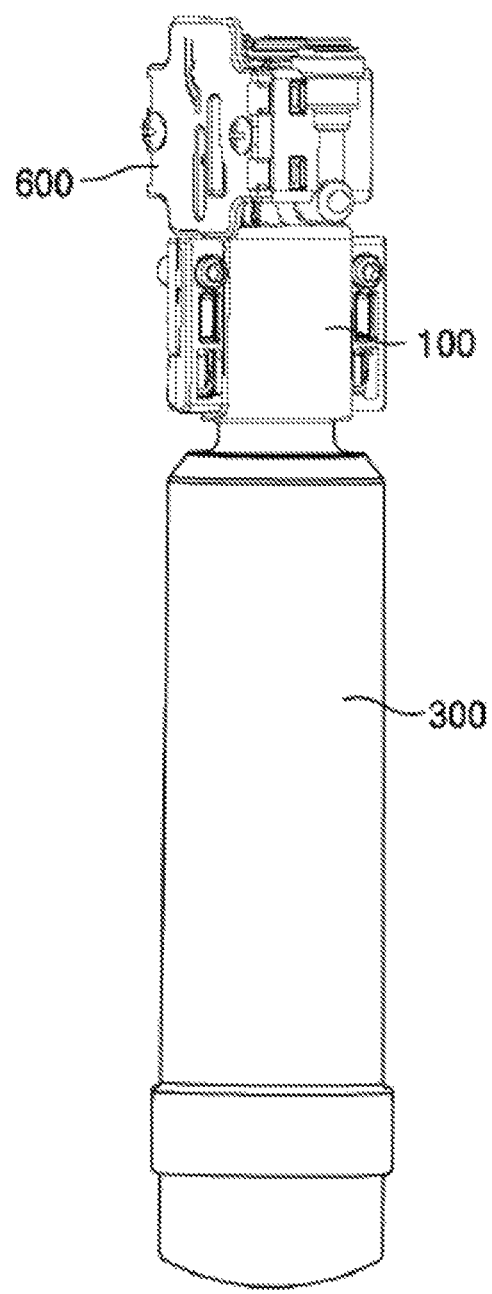
FIGS. 2 and 3 are perspective views illustrating a filter assembly and a filter coupled therewith in accordance with one embodiment of the present invention.
Figure 3:
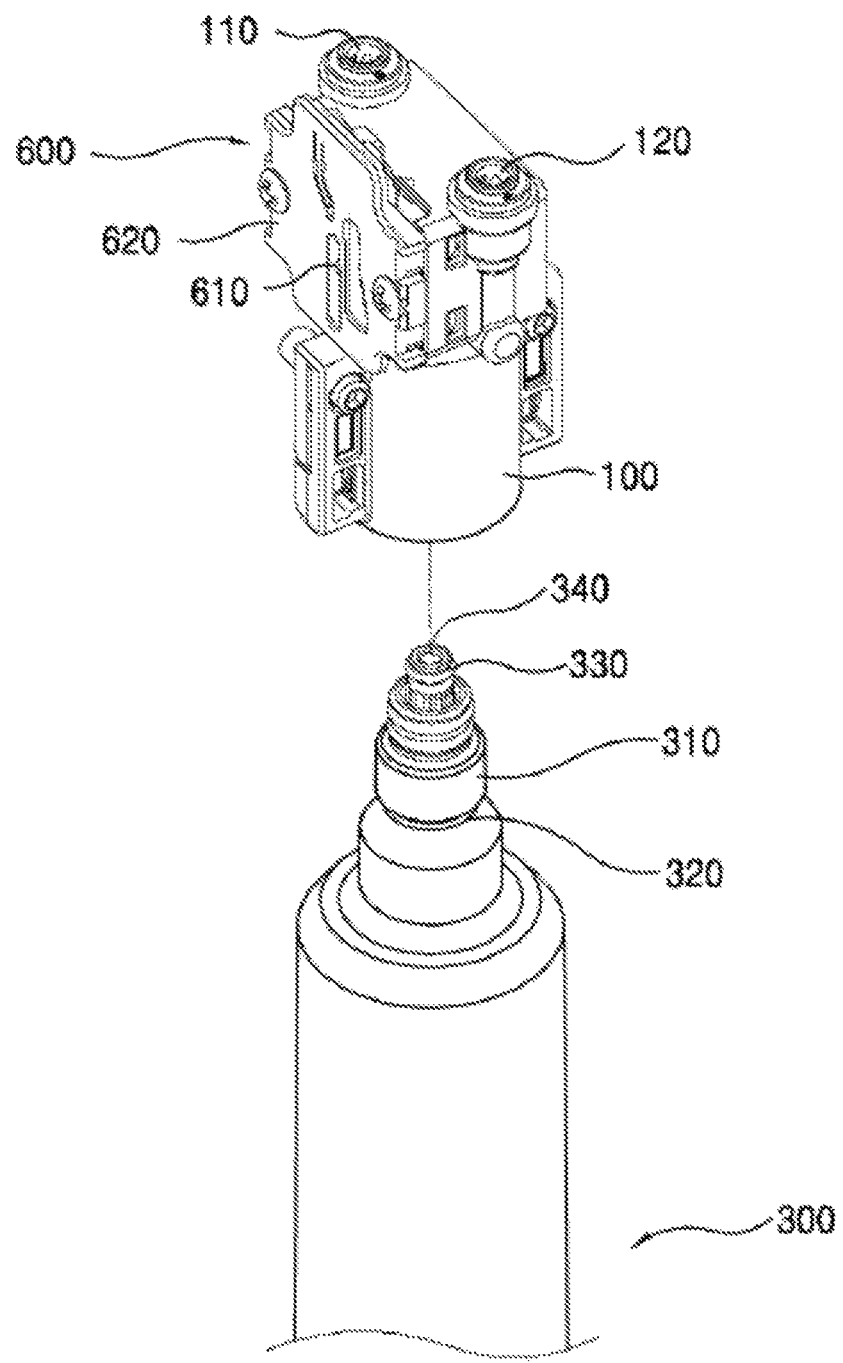
Figure 4:
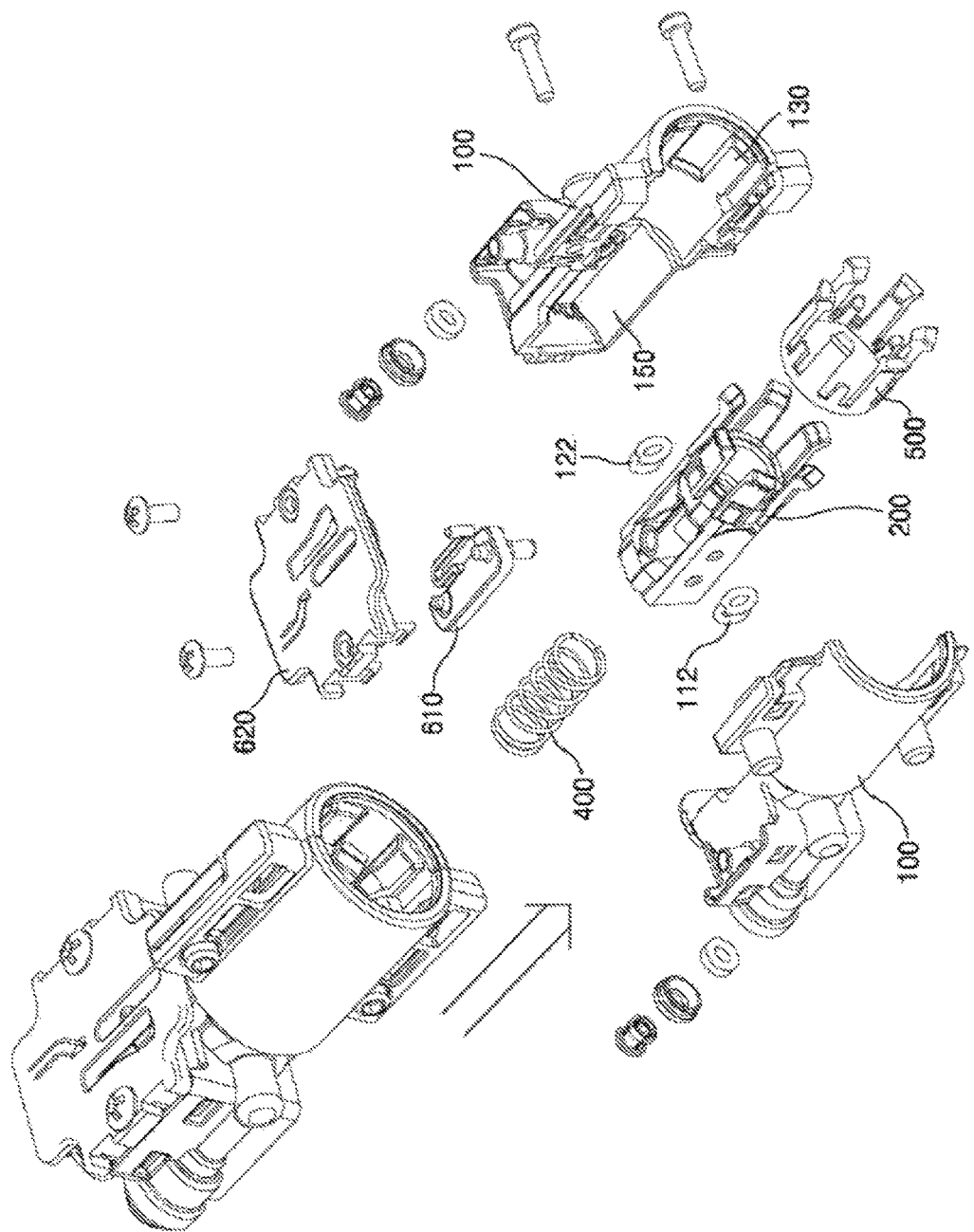
FIG. 4 is an exploded perspective view of the filter assembly except the filter in accordance with one embodiment of the present invention.

FIGS. 2 and 3 are perspective views illustrating a filter assembly and a filter coupled therewith in accordance with one embodiment of the present invention. FIG. 4 is an exploded perspective view of the filter assembly except the filter in accordance with one embodiment of the present invention.

As shown in the drawings, the filter assembly in accordance with one embodiment of the present invention may include an external housing 100, an inner cap 200, and elastic member 400, and a filter fastening unit 500.

In more detail, the external housing 100 may include an inlet 110 into which water flows from the outside and an outlet 120 for discharging purified water outside, may be formed with a plurality of uneven portions 130 circularly arranged at certain intervals on an inner wall of an open bottom, may have a hollow inner space therein, and may form the overall external shape.

Also, the inner cap 200 includes a plurality of auxiliary sections 210 (refer to FIG. 5) formed in the external housing 100 and circularly arranged on an outer circumferential surface of a bottom. When an external force is received, the plurality of auxiliary sections 210 may support an inner surface of the external housing 100 between the plurality of uneven portions 130 and moves up and down.

The filter 300 may include a head portion 310 to be inserted into the bottom of the inner cap 200. A fitting groove 320 may be formed on a side of the head portion 310. As shown in the drawing, a purified water outlet 340 may be located in a center, and an original water inlet 330 may be disposed around a circumference of the purified water outlet 340, thereby forming a structure with a step.

Here, the filter 300 may be formed while having a concentric circle with the inner cap 200 to allow planar centers to coincide with each other.

Also, since the elastic member 400 may be disposed between an upper portion of the inner wall of the external housing 100 and an upper portion of an outer surface of the inner cap 200, when the head portion 310 of the filter 300 receives a force from an inside of the inner cap 200 in an upper direction, a repulsive force may act.

Also, the filter fastening unit 500 may include a plurality of pressurized sections 510 (refer to FIG. 5) which have a structure of intersecting with the plurality of auxiliary sections 210 and are arranged around the bottom of the inner cap 200 to correspond to the plurality of uneven portions 130.

Here, in the filter fastening unit 500, when the filter 300 is inserted into the inner cap 200, the plurality of pressurized sections 510 are pressurized by the plurality uneven portions 130 in such a way that steps formed inside ends of the plurality of pressurized sections 510 may be fixed to the fitting groove 320 of the filter 300.

Due to the components described above, the filter assembly in accordance with one embodiment of the present invention may allow water to pass through the filter 300 by covering an open top surface corresponding to the head portion 310 of the filter 300 when the filter 300 is assembled.

Referring to the drawings, the filter assembly in accordance with one embodiment of the present invention will be described in detail as follows.

Figure 7:
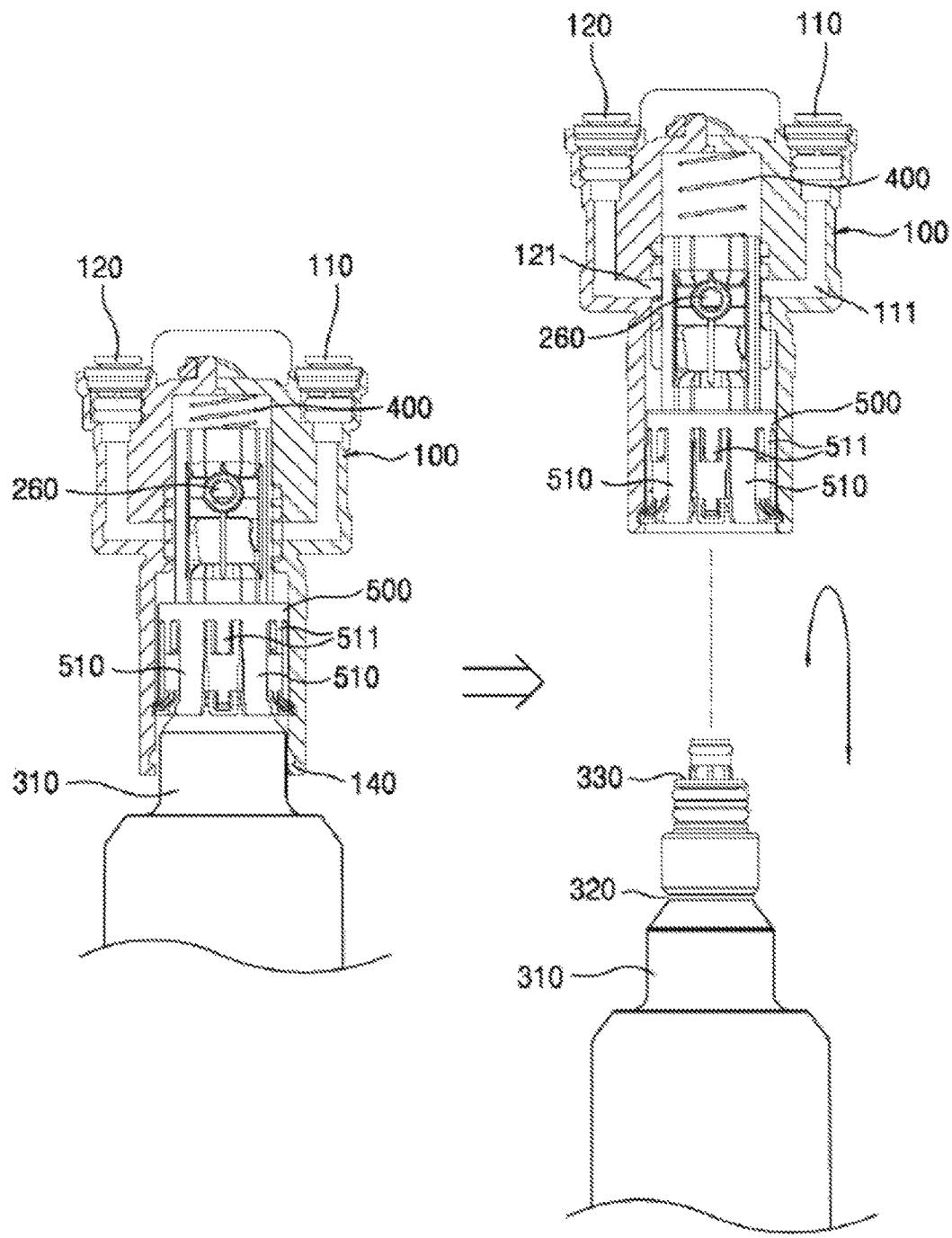
FIG. 7 is a schematic diagram illustrating an operation of separating the filter from the filter assembly in accordance with one embodiment of the present invention.

In the filter assembly in accordance with one embodiment of the present invention, a supply pipe 111 may be formed from the inlet 110 to be connected and a discharge pipe 121 may be formed from the outlet 120 to be connected in the external housing 100 (refer to FIG. 7.).

Here, the supply pipe 111 and the discharge pipe 121 may be connected to a bypass flow channel or a water purifying flow channel formed in the inner cap 200 which will be described below.

Also, to form the bypass flow channel and water purifying flow channel by being coupled with the inner cap 200, the supply pipe 111 and the discharge pipe 121 may include sealing members 112 and 122, which will be described below, to prevent a leakage of a connection portion between the bypass flow channel and water purifying flow channel.

Meanwhile, in the embodiment of the present invention, the external housing 100 may be formed by assembling two divided partitions 100a and 100b and may be assembled using a screw-fixing method as shown in the drawing not only to be simply assembled and fixed but also to be strongly fastened and may be coupled in various methods in addition thereto, for example, by being fastened in a sliding structure and then holding a hook to fix a screw.

Also, as shown in the drawings, the inlet 110 and the supply pipe 111 form an inflow pipe conduit corresponding to an inflow path of inflow water and the outlet 120 and the discharge pipe 121 form an outflow pipe conduit corresponding to an outflow path of outflow water. Here, since the supply pipe 111 and the discharge pipe 121 are formed in an elbow type structure and connected to a side of the inner cap 200, it is easy to assemble and disassemble the filter 300 rather than a conventional flow path linearly formed.

In the embodiment of the present invention, the external housing 100 may include an inner wall 150 which forms a hollow inner space to dispose the inner cap 200 and will be described below and a detachment preventing protrusion 140 (refer to FIG. 7) formed on a bottom end of the inside to allow ends of the plurality of pressurized sections 510 which form the filter fastening unit 500 and supporting protrusions formed at ends of the plurality of auxiliary sections 210 to be held by the detachment preventing protrusion 140 to prevent the filter fastening unit 500 and the inner cap 200 from being externally detached when the filter 300 is separated.

Also, the inner cap 200, as shown in the drawings, may form an accommodation space 220 (refer to FIG. 6) formed inside the external housing 100 while having a shape corresponding to a hollow of the inner wall of the external housing 100 for accommodating the filter 300 from a bottom.

When the filter 300 is assembled in the accommodation space 220 of the inner cap 200, the inner cap 200 may surrounds a lateral circumference of the head portion 310 of the filter 300 and a circumference of a bottom thereof may be coupled with the filter fastening unit 500 to fasten the filter 300.

In more detail, the inner cap 200 may be formed with the open bottom and the filter fastening unit 500 which is in close contact with the inner wall 150 of the external housing 100 and tightened or open while moving up and down may be disposed on an outer circumferential surface of the bottom.

Here, the filter fastening unit 500 includes the plurality of pressurized sections 510 to be coupled with the inner cap 200 while surround the bottom thereof and the supporting protrusion described above is formed outside the ends below the plurality of pressurized sections 510, thereby being held by and fixed to the uneven portion 130 of the external housing 100 when the filter 300 is inserted.

Also, the filter fastening unit 500 includes a coupling section 511 between the plurality of pressurized sections 510 in such a way that the coupling section 511 may be coupled with a coupling groove 211 (refer to FIG. 5) formed on an outer surface of each of the plurality of auxiliary sections 210 provided at the inner cap 200.

Also, the inner cap 200 may include a through hole 230 which passes through the side to form a bypass flow channel when the filter 300 is disassembled and a position returns to an original position due to a repulsive force of the elastic member 400 which will be described below and may further include an inlet hole 240 (not shown) and an outlet hole 250 to form a water purifying flow channel when the filter 300 is assembled.

Meanwhile, the filter assembly in accordance with one embodiment of the present invention, as shown in the drawings, may further include a ratchet member 600.

In the embodiment of the present invention, the ratchet member 600 may perform a push-and-push type one touch operation and may be used to guide the position of the inner cap 200 when the filter 300 is assembled and disassembled while the inner cap 200 receives force in a vertical direction in the open bottom of the external housing 100 and a detailed description will be described below with reference to FIG. 10.

Figure 5:
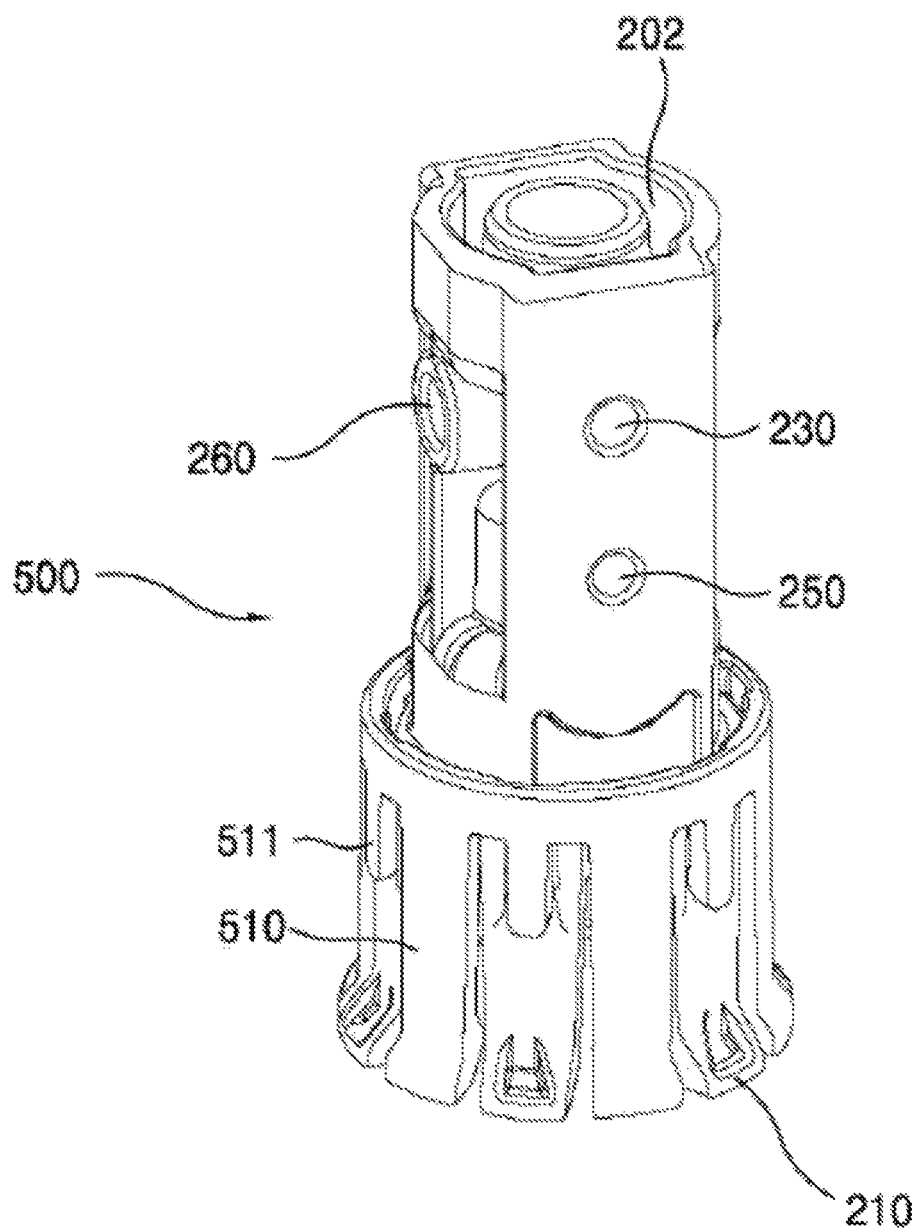
FIG. 5 is a perspective view illustrating a state in which a filter fastening unit is couple with an inner cap in accordance with one embodiment of the present invention.
Figure 6:
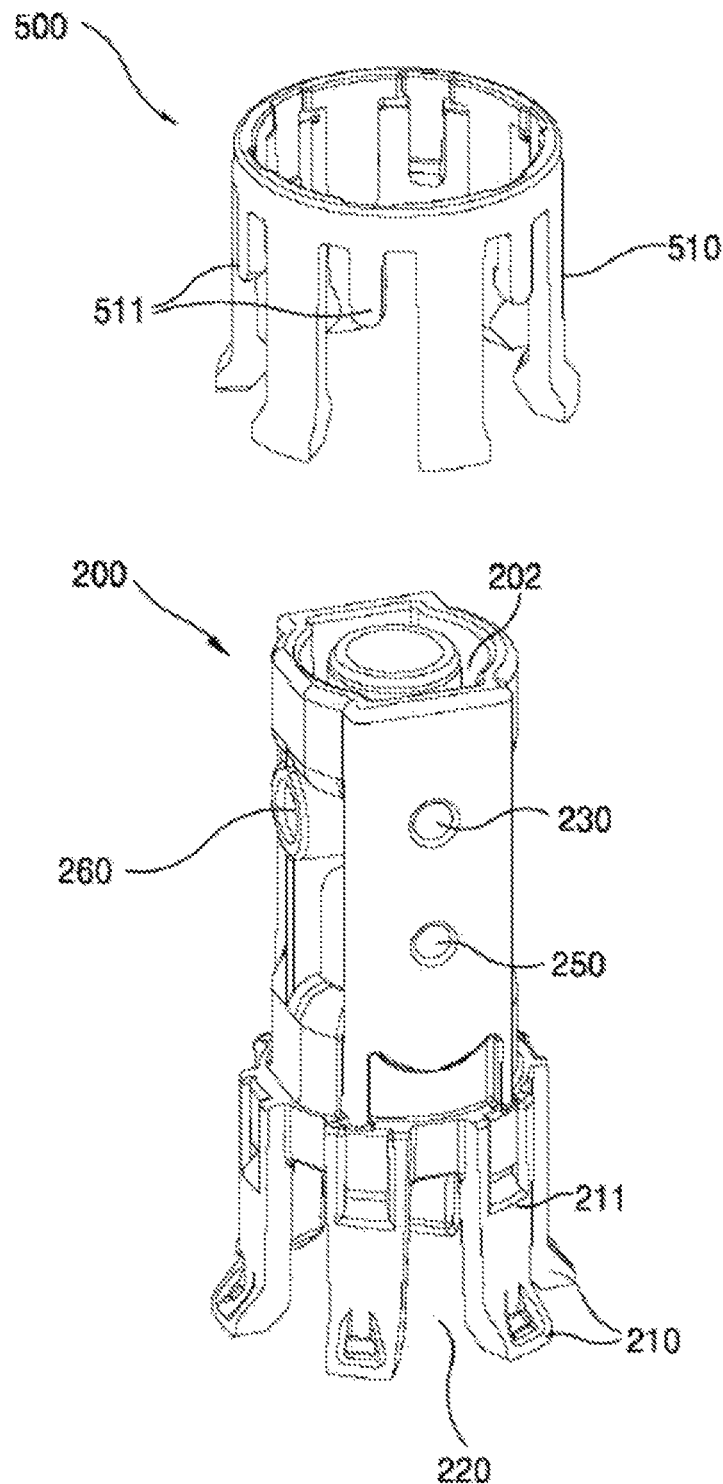
FIG. 6 is a perspective view illustrating a state in which the filter fastening unit is separated from the inner cap shown in FIG. 5.

FIG. 5 is a perspective view illustrating a state in which the filter fastening unit 500 is couple with the inner cap 200 in accordance with one embodiment of the present invention. FIG. 6 is a perspective view illustrating a state in which the filter fastening unit 500 is separated from the inner cap 200 shown in FIG. 5.

Referring to the drawings, the inner cap 200 in accordance with one embodiment of the present invention will be described in detail as follows.

First, the elastic member 400 described above with reference to FIG. 4 may be formed of a spring in accordance with one embodiment of the present invention. When the inner cap 200 vertically moves up while the elastic member 400 is mounted on a top end of the inner cap 200 shown in the drawing, a repulsive force against an inner surface of an upper portion of the inner wall 150 of the external housing 100 may be provided.

That is, the elastic member 400 may be formed while protruding from an outer surface of a top thereof to mutually have repulsive forces with the upper surface of the inner wall 150 of the external housing 100 against each other when the filter 300 is inserted into an accommodation space 220 which will be described below.

Here, in the embodiment of the present invention, a spring groove 202 in an annular shape may be formed at a top surface of the inner cap 200 and may be elastically fixed to a bottom in a stable state while a spring is mounted thereon.

Also, the accommodation space 220 corresponding to the open top surface of the filter 300 may be formed at the bottom inside the inner cap 200. That is, the accommodation space 220 and the head portion 310 of the filter 300 may have mutually corresponding cylindrical shapes.

Also, the filter fastening unit 500 may be formed of the plurality of pressurized sections 510 circularly arranged at certain intervals and disposed on the circumference of the bottom of the inner cap 200. The filter fastening unit 500 is separated from the inner cap 200 in the embodiment of the present invention but may be integrally formed.

Here, the steps corresponding to the fitting groove 320 formed along the side of the head portion 310 of the filter 300 may be provided at the ends inside the pressurized sections 510. Also, supporting protrusions may be provided at the ends outside the pressurized sections 510, which is in close contact with and fixed to the inner wall of the external housing 100 when coupled with the filter 300 and corresponds to the detachment preventing protrusion 140 formed at inner edge of the bottom of the external housing 100 when separated from the filter 300.

In more detail, in the case of the filter fastening unit 500, as described above, the plurality of pressurized sections 510 are radially formed along a circumference of the accommodation space 220 of the inner cap 200. Due to the pressurized sections 510, when the filter 300 is inserted into the inner cap 200 to be assembled therewith, it is possible to simply assemble the filter 300 with the inner cap 200 without directivity.

Also, the steps of the pressurized sections 510 which form the filter fastening unit 50 may have an incline on an inner surface thereof and the supporting protrusion may have an incline on an outer surface thereof.

In the embodiment of the present invention, since the external housing 100 includes the plurality of uneven portions 130 formed at the bottom of the inner surface thereof while protruding corresponding to the plurality of pressurized sections 510, when the filter 300 is assembled with the inner cap 200, the repulsive forces act between the uneven portions 130 and the plurality of pressurized sections 510 of the filter fastening unit 500 and the supporting protrusions formed at the ends outside the pressurized sections 510 are pressurized to allow the steps formed at the ends inside the pressurized sections 510 to be in close contact with the fitting groove 320 of the filter 300 to fix.

Here, in the case of the external housing 100, the uneven portions 130 may be radially formed on an inner circumferential surface of a bottom of the inner wall 150 of the external housing 100 to correspond to the plurality of pressurized sections 510.

Here, in the case of the inner cap 200, the plurality of auxiliary sections 210 which intersect with the plurality of pressurized sections 510 of the filter fastening unit 500 may be circularly arranged at certain intervals along the circumference of the bottom thereof and each of the plurality of auxiliary sections 210 may be allowed to be inserted in an insertion groove formed between the uneven portions 130 of the external housing 100 to support a moving direction of the filter 300 when the filter 300 is assembled or disassembled.

That is, the plurality of auxiliary sections 210 are to vertically support an up-and-down movement of the inner cap 200 without left-and-right movement while the inner cap 200 moves up and down in the inner wall 150 of the external housing 100. As described above, when the plurality of auxiliary sections 210 are inserted into the insertion groove between the uneven portions 130 of the external housing 100, the inner cap 200 may move up and down while being in close contact with the inner circumferential surface of the external housing 100.

Meanwhile, as shown in the drawings, the pressurized sections which form the filter fastening unit 500 and the inner cap 200 are separately formed but may be integrally molded as described above.

Also, as shown in the drawings, in the case of the filter fastening unit 500, the coupling section 511 may be formed between the pressurized sections 510 and may be inserted into the coupling groove 211 of the auxiliary section 210 formed at the inner cap 200 through one touch to be assembled therewith.

Also, in accordance with one embodiment of the present invention, the detachment preventing protrusion 140 may be formed at the bottom end inside the external housing 100. When the filter 300 is separated from the inner cap 200, due to the detachment preventing protrusion 140, the pressurized sections 510 of the filter fastening unit 500 and the supporting protrusions formed at the ends outside of the auxiliary sections 210 of the inner cap 200 are held by the detachment preventing protrusion 140, thereby preventing the inner cap 200 from being detached from the external housing 100.

Figure 8:
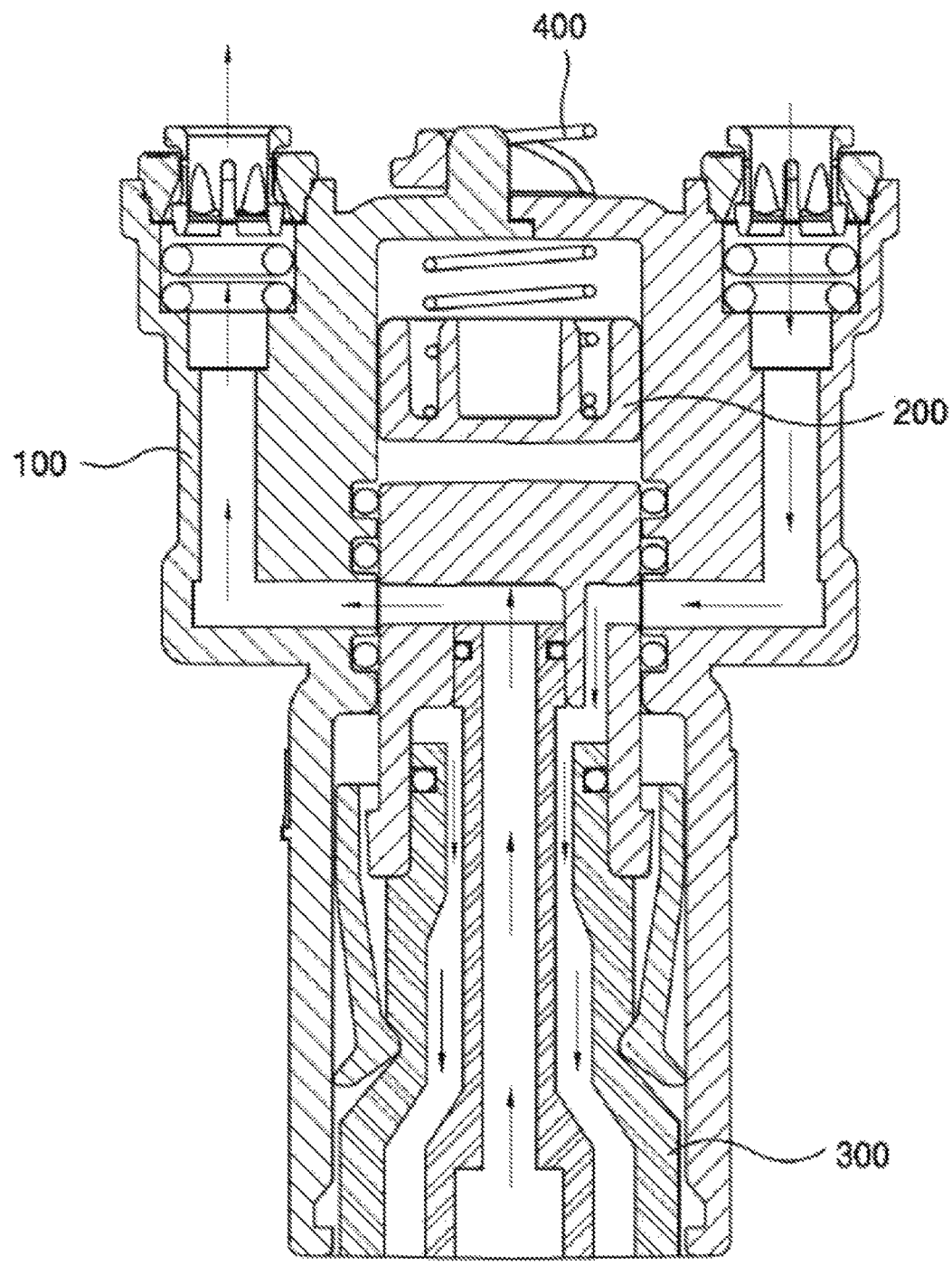
FIG. 8 is a cross-sectional view of a water purifying flow channel formed when the filter is assembled in the operation shown in FIG. 7.
Figure 9:
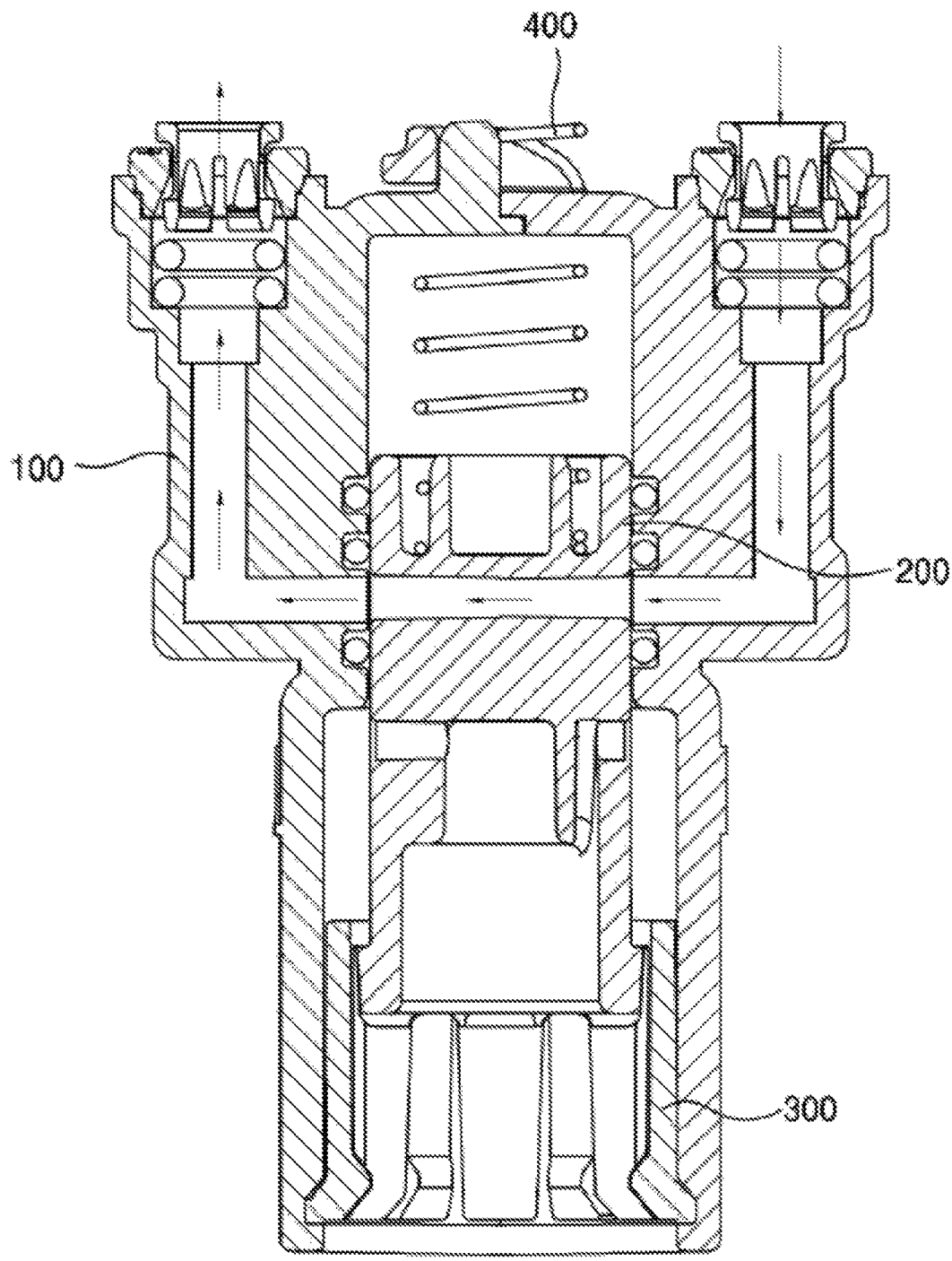
FIG. 9 is a cross-sectional view of a bypass flow channel formed when the filter is separated in the operation shown in FIG. 7.

FIG. 7 is a schematic diagram illustrating an operation of separating the filter 300 from the filter assembly in accordance with one embodiment of the present invention. FIG. 8 is a cross-sectional view of a water purifying flow channel formed when the filter 300 is assembled in the operation shown in FIG. 7. FIG. 9 is a cross-sectional view of a bypass flow channel formed when the filter is separated in the operation shown in FIG. 7.

Referring to the drawings, the operation of assembling or separating the filter with or from the filter assembly in accordance with one embodiment of the present invention will be described in detail as follows.

First, the filter 300 applied in the embodiment of the present invention is for purifying water which flows from the outside and may include the fitting groove 320 which is formed on the side of the head portion 310 and is fastened due to tightening of the pressurized sections which form the filter fastening unit 500 or unfastened due to opening of the pressurized sections 510.

Accordingly, when the filter 300 pulls the inner cap 200 and moves up in the external housing 100, the inner cap 200 and the filter 300 maintain a fastened state. On the other hand, when the inner cap 200 moves down, since the fastened state of the inner cap 200 and the filter 300 is released, the filter 300 may be separated.

Also, as shown in the drawings, in the case of the filter assembly in accordance with one embodiment of the present invention, when the filter 300 is inserted into the inner cap 200 and the position of the inner cap 200 is moved to the top of the inner wall 150 of the external housing 100, the through hole 230 which forms the bypass flow channel is opened. When the filter 300 is separated from the inner cap 200 and the position of the inner cap 200 is moved to the bottom of the inner wall 150 of the external housing 100, the outlet hole 250 which forms the water purifying flow channel is opened, thereby switching a flow channel.

That is, in the embodiment of the present invention, in the inner cap 200 includes a plurality of flow channels therein in which the bypass flow channel is disposed on top and the water purifying flow channel is disposed at the bottom. When the filter 300 is inserted, the inner cap 200 may move up in the external housing 100 and the water purifying flow channel disposed at the bottom may be connected. When the fastening of the filter 300 is released, the inner cap 200 may move down in the external housing 100 and the bypass flow channel disposed on top may be connected.

Here, in the accommodation space 220 formed at the bottom inside the inner cap 200, the head portion 310 of the filter 300 is inserted and the original water inlet 330 and the purified water outlet 340 formed in stepped structures at the top end of the head portion 310, respectively, thereby forming the water purifying flow channel.

That is, in the embodiment of the present invention, the switching of the flow channel may be performed simultaneously with fastening or unfastening between the filter 300 and the filter assembly. As shown in FIG. 8, when the filter 300 is inserted into the inner cap 200 and moved up, the water purifying flow channel formed in the inner cap 200 may be connected to the inlet 110 and the outlet 120 of the external housing 100 and opened. As shown in FIG. 9, when the filter 300 is separated from a filter head, the through hole 230 which forms the bypass flow channel of the inner cap 200 may be connected to the inlet 110 and the outlet 120 of the external housing 100 and opened.

Also, in the embodiment of the present invention, to allow the filter 300 to be inserted into the inner cap 200 and fixed to the filter assembly, as described above, the structure in which the plurality of pressurized sections 510 which form the filter fastening unit 500 and the fitting groove 320 formed at the filter 300 correspond to each other may be provided and the uneven portions 130 for controlling the fastened state of the filter 300 by pressurizing or releasing the pressurized sections 510 may be formed at the bottom inside the external housing 100.

As described above, in the filter assembly in accordance with one embodiment of the present invention, the inner cap 200 may move up or down due to the up-and-down movement of the filter 300, thereby switching of the flow channel.

Figure 10:
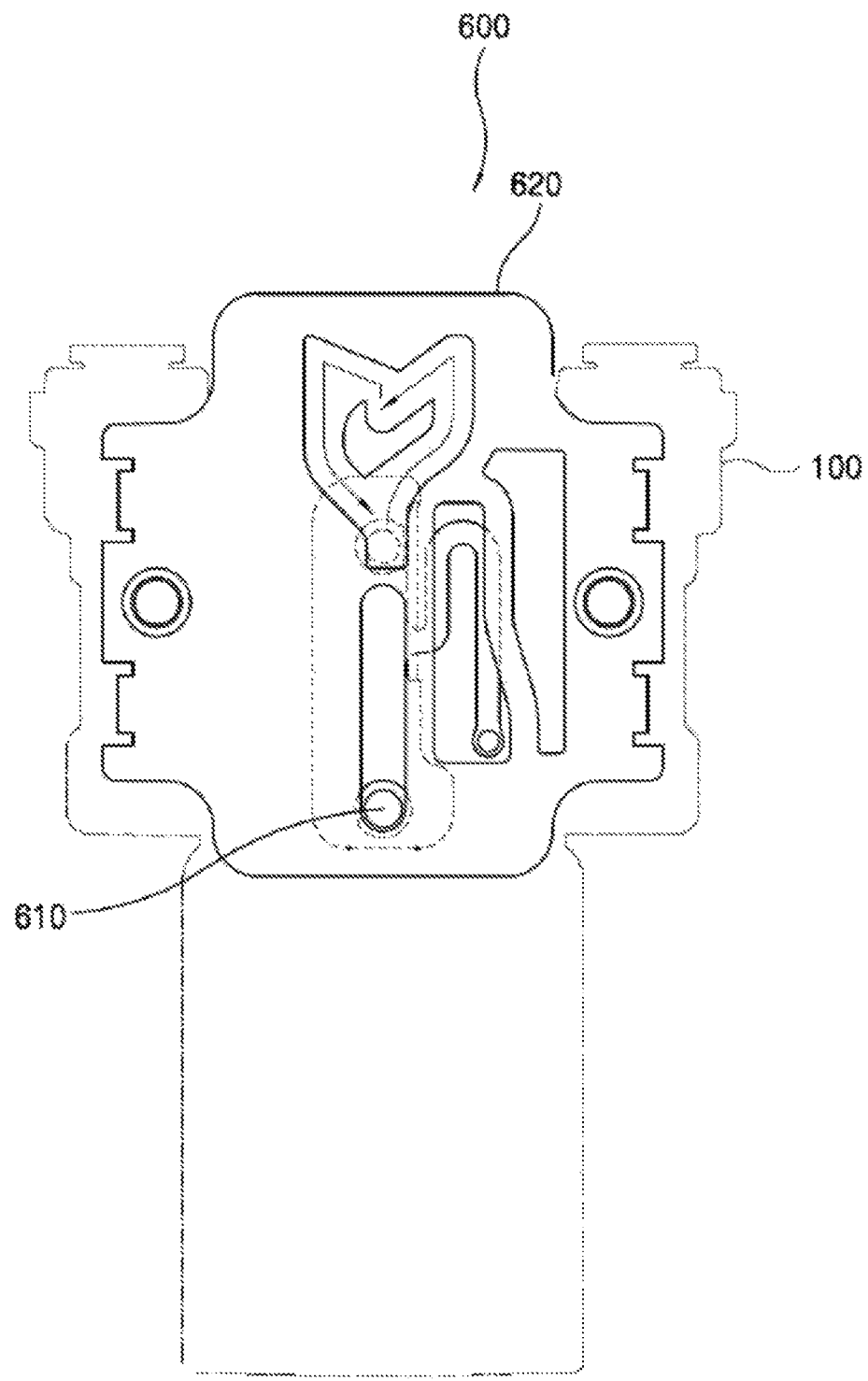
FIG. 10 is a schematic front view of a ratchet member in accordance with one embodiment of the present invention.

FIG. 10 is a schematic front view of the ratchet member 600 in accordance with one embodiment of the present invention.

As shown in the drawings, the ratchet member 600 described above with reference to FIGS. 2 to 4 in accordance with one embodiment of the present invention may include a ratchet guide pin 610 and a ratchet guide plate 620.

In more detail, the ratchet guide pin 610 may be coupled with the upper portion of the outer surface of the inner cap 200 and may guide the position and a movement path of the inner cap 200.

Also, the ratchet guide plate 620 may be connected to the ratchet guide pin 610 while being fixed to the external housing 100 and may include a ratchet path for allowing the inner cap 200 to move up and down in the inner wall 150 of the external housing 100 when the filter 300 is assembled with or released from the accommodation space 220 of the inner cap 200.

In the embodiment of the present invention, the filter 300, while having the elastic restoration force of the elastic member 400 described above, may be fixed or separated by the ratchet member 600 using a one touch type push-and-push method while being fastened to the inner cap 200.

That is, in a state in which the inner cap 200 built in the external housing 100 is elastically fixed to the elastic member 400 to have a repulsive force against the bottom, the filter 300 may be assembled and released by the ratchet member 600 for the up-and-down movement using the push-and-push method.

In the embodiment of the present invention, to induce the up-and-down movement of the inner cap 200, the ratchet guide pin 610 may move up and down in the external housing 100 while being coupled with the inner cap 200. To move the movement path of the ratchet guide pin 610, the ratchet guide plate 620 may be mounted outside the external housing 100 and may restrict an operation range to allow the inner cap 200 to be fixed in a state of being moved up or down in the external housing 100.

As described above, to fasten the filter 300, the filter assembly in accordance with one embodiment of the present invention may push the filter 300 using the ratchet member 600 in the one touch push-and-push method. To separate the filter 300, the fastening may be released by pushing the filter 300 using the ratchet member 600 in the one touch push-and-push method.

Also, in the embodiment of the present invention, since the filter 300 is separated by pushing, the filter 300 may be easily separated by allowing the sealing members 114 and 124 to be released from a state of being fastened to the bypass flow channel or water purifying flow channel.

As is apparent from the above description, in a filter assembly in accordance with one embodiment of the present invention, an uneven portion is formed on an inner wall of a hollow external housing and a filter fastening unit which includes a pressurized section pressurized by the uneven portion is formed around an inner cap which moves up and down along an inner surface of the external housing to firmly fasten a filter.

Also, components of the inner cap formed on the inner wall of the external housing and the filter fastening unit are simplified and reduced and manufacturing costs and processes are reduced, thereby increasing productivity.

Also, a supply pipe and a discharge pipe connected to and in contact with a side of the inner cap in an elbow structure are formed in the external housing to allow the filter to be easily assembled and disassembled.

In addition, the filter assembly includes a ratchet member which guides a position of the inner cap through rotation in one direction to perform a push-and-push type one touch operation.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A filter assembly comprising:
   a hollow external housing which comprises an inlet and an outlet and a plurality of uneven portions circularly arranged at certain intervals are formed on an inner wall of an open bottom;
   an inner cap which is formed in a cylindrical shape with an open bottom corresponding to an internal hollow shape of the external housing and moves up and down along the inner wall of the external housing;
   a filter which comprises a head portion inserted into the bottom of the inner cap and forms a fitting groove on a side of the head portion;
   an elastic member which is disposed between an upper portion of the inner wall of the external housing and an upper portion of an outer surface of the inner cap and has a repulsive force which acts when the head portion of the filter receives a force from a top in the inner cap; and
   a filter fastening unit which comprises a plurality of pressurized sections disposed on a lower circumference of the inner cap corresponding to the plurality of the uneven portions, in which when the filter is inserted into the inner cap, the plurality of pressurized sections are pressurized by the plurality of uneven portions formed on the inner wall of the external housing and steps formed at ends while protruding inside the plurality of pressurized sections are fixed to the fitting groove of the filter.

2. The filter assembly of claim 1, wherein the inner cap further comprises a plurality of auxiliary sections which intersect with the plurality of pressurized sections which form the filter fastening unit and are circularly arranged on an outer circumferential surface of the bottom thereof,
   wherein when the inner cap receives an external force and moves up and down, the plurality of auxiliary sections move while supporting an inner surface of the external housing between the plurality of uneven portions.

3. The filter assembly of claim 2, wherein the external housing comprises a detachment preventing protrusion formed on an edge inside the opening bottom in such a way that a supporting protrusion formed at an end of each of the plurality of pressurized sections and at an end of each of the plurality of auxiliary sections while protruding outward are held by the detachment preventing protrusion and prevents the inner cap and the filter fastening unit from being externally detached.

4. The filter assembly of claim 2, the filter fastening unit comprises a coupling section between the plurality of pressurized sections to allow the coupling section to be coupled with a coupling groove formed on an outer surface of each of the plurality of auxiliary sections provided at the inner cap.

5. The filter assembly of claim 1, wherein the inner cap comprises a plurality of flow channels therein in which a bypass flow channel is disposed on top and a water purifying flow channel is disposed at the bottom,
wherein when the filter is inserted, the inner cap moves up in the external housing and the water purifying flow channel disposed at the bottom is connected, and
wherein when the fastening of the filter is released, the inner cap moves down in the external housing and the bypass flow channel disposed on top is connected.

6. The filter assembly of claim 5, wherein the external housing comprises a supply pipe and a discharge pipe to which the inlet and the outlet are connected to and in contact with the side of the inner cap in an elbow structure, respectively.

7. The filter assembly of claim 6, wherein the supply pipe and the discharge pipe comprise sealing members for watertight structures of portions thereof connected to and in contact with the side of the inner cap, respectively.

8. The filter assembly of claim 1, further comprising a ratchet member which receives forces from a top and a bottom at the open bottom of the external housing, performs a push-and-push type one touch operation when the filter is assembled and released, and guides a position of the inner cap.

9. The filter assembly of claim 8, wherein the ratchet member comprises:
a ratchet pin which is fixed to an outer surface of the inner cap and guides the position of the inner cap; and
a ratchet guide plate connected to the ratchet guide pin while being fixed to the external housing and comprises a ratchet path for allowing the inner cap to move up and down in the inner wall of the external housing when the filter is assembled with or released from an inside of the inner cap.

10. The filter assembly of claim 1, wherein the filter is formed in structure in which a purified water outlet is located in a center and an original water inlet is disposed around the purified water outlet with a step therebetween.

11. A filter assembly comprising:
a hollow external housing which comprises an inlet and an outlet, a plurality of uneven portions circularly arranged at certain intervals are formed on an inner wall of an open bottom, and a detachment preventing protrusion is formed on an inner edge of an entrance of the open bottom;
an inner cap which is formed in a cylindrical shape with an open bottom corresponding to an internal hollow shape of the external housing, comprises a plurality of pressurized sections integrally formed on a lower circumference thereof corresponding to the plurality of uneven portions, and moves up and down along the inner wall of the external housing;
a filter which comprises a head portion inserted into the bottom of the inner cap and forms a fitting groove on a side of the head portion; and
an elastic member which is disposed between an upper portion of the inner wall of the external housing and an upper portion of an outer surface of the inner cap and has a repulsive force which acts when the head portion of the filter receives a force from a top in the inner cap,
wherein when the filter is inserted into the inner cap, the plurality of pressurized sections are pressurized by the plurality of uneven portions formed on the inner wall of the external housing and steps formed at ends while protruding inside the plurality of pressurized sections are fixed to the fitting groove of the filter, and
wherein when the filter is externally separated from the inner cap, supporting portions formed at ends of the plurality of pressurized sections while protruding outward are held by the detachment preventing portion and prevent the inner cap from being externally detached.

* * * * *